(12) United States Patent
Niedermeyer et al.

(10) Patent No.: US 8,104,962 B2
(45) Date of Patent: Jan. 31, 2012

(54) ADJUSTABLE LINEAR SLIDE AND METHOD OF ASSEMBLY

(75) Inventors: John F. Niedermeyer, Woodbury, CT (US); Kyle Bober, Carlsbad, CA (US)

(73) Assignee: Tritex Corporation, Waterbury, CT (US)

( * ) Notice: Subject to any disclaimer, the term of this patent is extended or adjusted under 35 U.S.C. 154(b) by 636 days.

(21) Appl. No.: 12/227,421

(22) PCT Filed: Mar. 5, 2007

(86) PCT No.: PCT/US2007/005647
§ 371 (c)(1),
(2), (4) Date: Nov. 17, 2008

(87) PCT Pub. No.: WO2007/136442
PCT Pub. Date: Nov. 29, 2007

(65) Prior Publication Data
US 2009/0110336 A1    Apr. 30, 2009

(51) Int. Cl.
*F16C 29/12* (2006.01)
(52) U.S. Cl. ............................... 384/40; 384/42
(58) Field of Classification Search .............. 384/39, 384/40, 42, 43, 45, 57
See application file for complete search history.

(56) References Cited

U.S. PATENT DOCUMENTS

| | | | |
|---|---|---|---|
| 1,727,284 A * | 9/1929 | Goolsby | 384/10 |
| 4,898,080 A | 2/1990 | Lieberman | |
| 5,181,780 A * | 1/1993 | Morita | 384/8 |
| 5,722,639 A | 3/1998 | Nonaka | |
| 6,240,796 B1 * | 6/2001 | Yamada | 74/89.23 |
| 6,461,046 B2 * | 10/2002 | Kahl | 384/40 |
| 6,561,056 B2 * | 5/2003 | Maffeis | 74/490.01 |
| 6,880,974 B2 * | 4/2005 | Moshammer | 384/39 |
| 6,977,450 B2 | 12/2005 | Asou et al. | |
| 7,080,943 B2 * | 7/2006 | Hisanobu et al. | 384/38 |

FOREIGN PATENT DOCUMENTS

| | | | |
|---|---|---|---|
| DE | 36 23 695 | * | 1/1988 |
| DE | 39 32 206 | * | 4/1991 |

* cited by examiner

*Primary Examiner* — William C Joyce
(74) *Attorney, Agent, or Firm* — Carmody & Torrance LLP

(57) ABSTRACT

In a preferred embodiment, an apparatus including: a longitudinally extending base member; a moving carriage assembly member adapted to move axial back-and-forth in the longitudinally extending base member; two bearing members extending sideways, on opposite sides, from the moving carriage assembly and engaging longitudinal bearing guides disposed in the longitudinally extending base member; and single means engaging the bearing members to simultaneously adjust the bearing members to take up any slop between the moving carriage assembly member and the longitudinally extending base member. A method of manufacturing the apparatus is also provided.

10 Claims, 7 Drawing Sheets

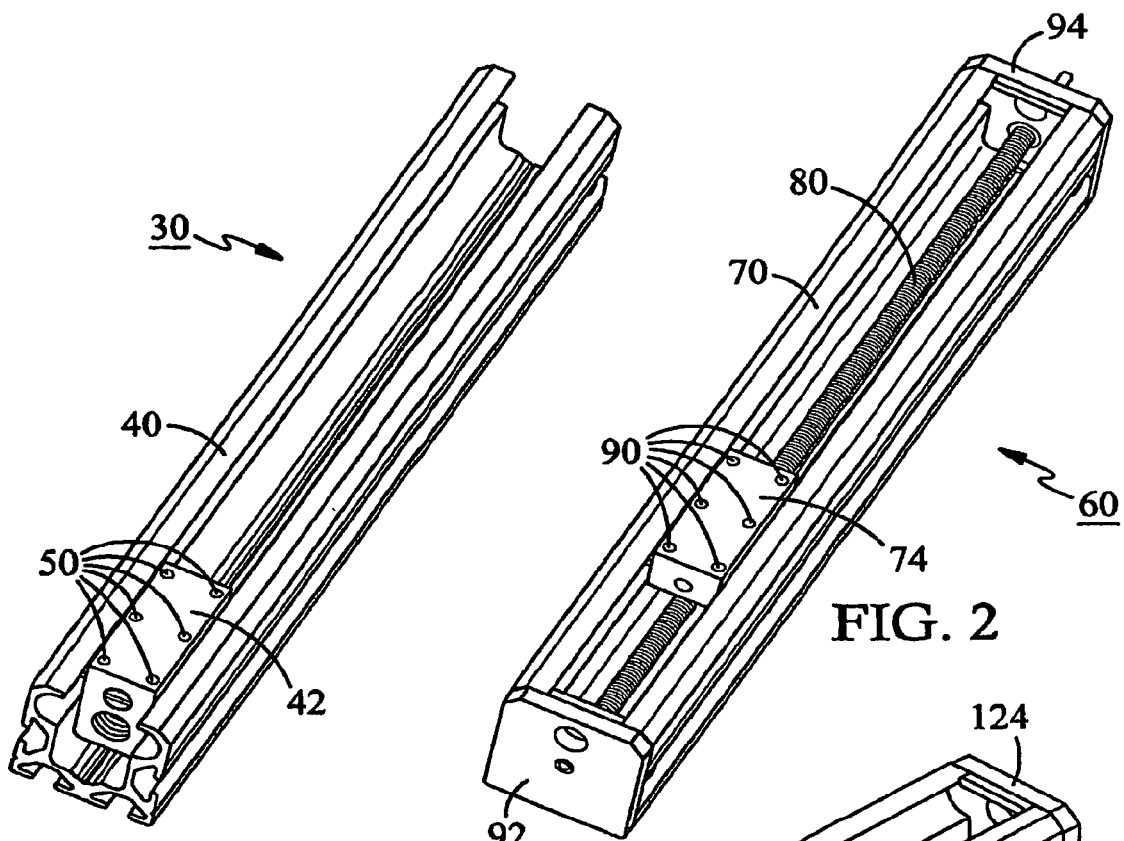
FIG. 1
FIG. 2
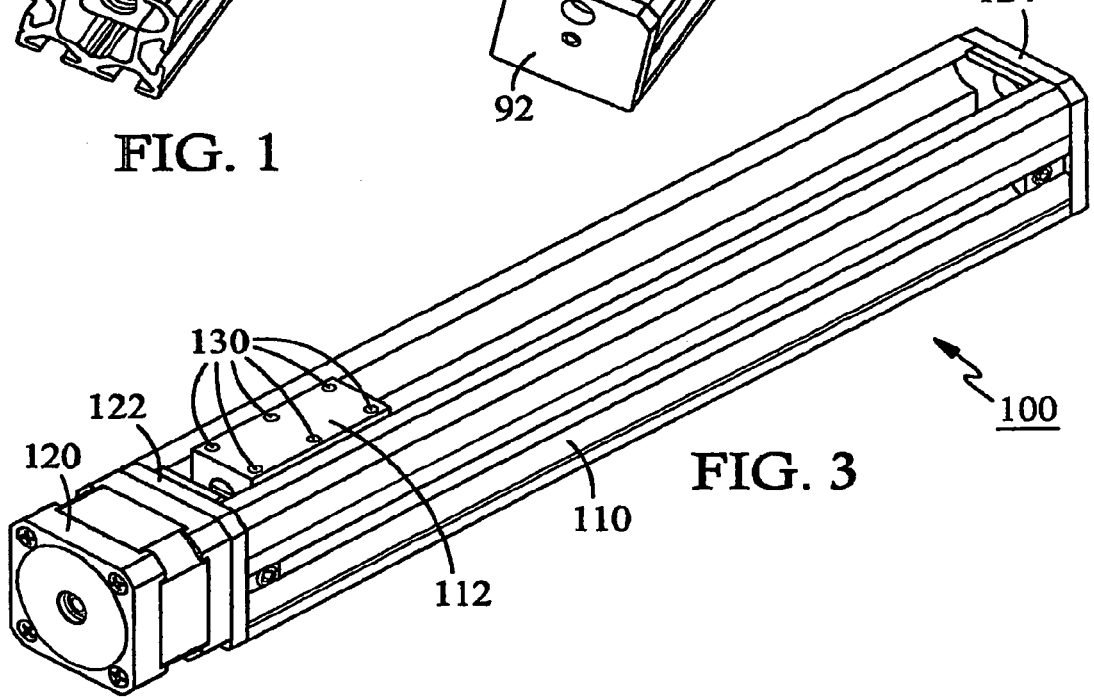
FIG. 3

ADJUSTABLE LINEAR SLIDE AND METHOD OF ASSEMBLY

CROSS REFERENCE TO RELATED APPLICATIONS

This application is the National Stage of International Application No. PCT/US2007/005647, filed on Mar. 5, 2007, now pending, which claims the benefit of U.S. Provisional Patent Application No. 60/800,758, filed on May 16, 2006.

TECHNICAL FIELD

The present invention relates to linear slides generally and, more particularly, to a novel adjustable carriage linear slide and method of assembly.

BACKGROUND ART

A linear slide is defined as a base with varying lengths and a moving carriage to which a load is attached. The carriage tends to be a geometric shaped block with integrated linear bearings that can be either sliding elements or rolling balls.

A linear stage is defined as a linear slide that has a built-in drive mechanism. The most common drive mechanisms are lead screws, ball screws, timing belts, and any other method of linear movement.

Finally, there are powered linear stages which incorporate on the stage a method of moving the drive mechanism. The mode of powering the drive mechanism is usually provided by a rotary motor which could be a stepper, brushed, brushless, or servo motor.

Although, technically, there are tree different types, as described above, all types will be referred to herein as linear slides.

Linear slides that utilize rolling ball elements as bearing surfaces are a more expensive solution and are generally referred to as ball slides. A less expensive solution has a plain, sliding-element bearing between the carriage and the base. A primary design consideration with this type of linear slide is the bearing surface which wears over time and produces increased clearances between the carriage and the base of the slide. The wear in the carriage produces misalignment between the drive mechanism and the carriage, further increasing wear and reducing the efficiency of the slide.

There are manual adjustments integrated into some slides allowing the user to adjust the bearing surfaces in the carriage after significant wear occurs. However, these mechanisms require multiple parts and, without careful adjustment, the carriage can be shifted unevenly to one side of the base.

Accordingly, it is a principal object of the present invention to provide a linear slide with a self-compensating, or manually adjusted, plain bearing surface on the carriage.

It is a further object of the present invention to provide such a product which has an adjustment that uses minimal parts and forces the bearing surfaces to be equally adjusted to both sides of the base via one adjuster, providing an inexpensive bearing surface with the ability to have high positional accuracy and longer life expectancy than conventional products.

It is an additional object of the present invention to further exploit an inexpensive product approach by utilizing an extrusion for the base, as this is a cost effective manufacturing method that is easily configurable.

It is another object of the present invention to provide such a product that is tolerable to the uneven load conditions that are expected while also offering a multitude of mounting options.

A further object of the present invention is to provide an inexpensive method of attaching end plates to the extrusion, without secondary machining, to produce a complete linear stage.

An additional object of the present invention is to create an error-proof method of assembling the carriage.

Another object of the present invention is to provide such a carriage that has sliding surfaces with good finish and dimensional tolerances that do not increase the looseness of the carriage-to-base interface.

Other objects of the invention, as well as particular features and advantages thereof, will be apparent or be elucidated in the following description and the accompanying drawing figures.

DISCLOSURE OF INVENTION

The present invention achieves the above objects, among others, by providing an apparatus, comprising: a longitudinally extending base member; a moving carnage assembly member adapted to move axial back-and-forth in said longitudinally extending base member; two bearing members extending sideways, on opposite sides, from said moving carriage assembly and engaging longitudinally bearing guides disposed in said longitudinally extending base member; and single means engaging said bearing members to simultaneously adjust said bearing members to take up any slop between said moving carriage assembly member and said longitudinally extending base member. A method of manufacturing said apparatus is also provided.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which:

FIG. 1 is a top/right side/front isometric view of an extruded base with a moving carriage disposed therein according to one embodiment of the present invention.

FIG. 2 is a top/left side/rear isometric view of the extruded base with end plates attached and the axial position of the moving carriage adjusted by means of a lead screw according to the embodiment shown on FIG. 1.

FIG. 3 is a top/right side/front elevational isometric view of the extruded base with a power source attached to the front according to the embodiment shown on FIG. 1.

BEST MODE FOR CARRYING OUT THE INVENTION

Figure 4:
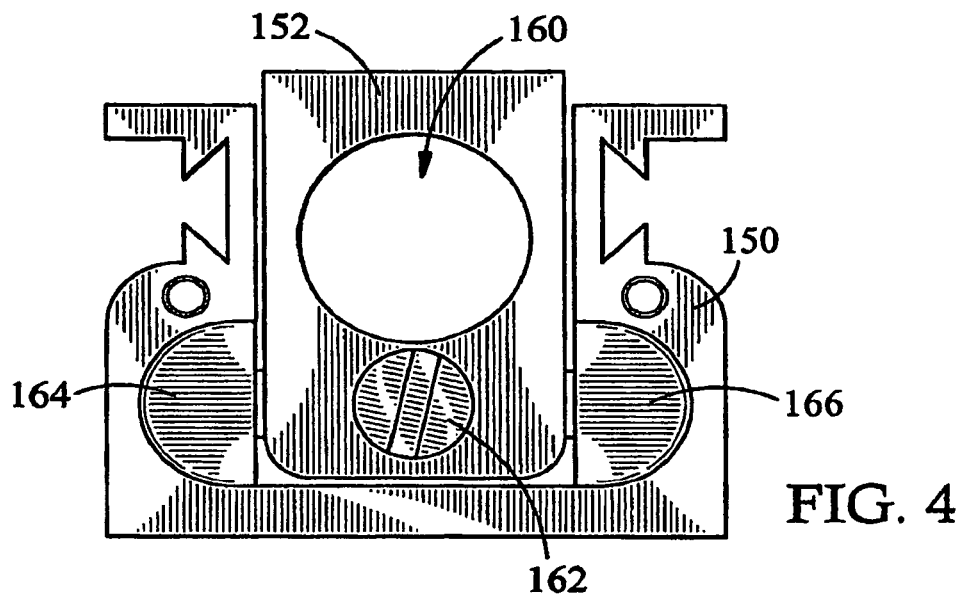
FIG. 4 is a front elevational view of an extruded base and a moving carriage according to a further embodiment of the present invention.

Reference should now be made to the drawing figures on which similar or identical elements are given consistent identifying numerals throughout the various figures thereof, and on which parenthetical references to figure numbers, when used, direct the reader to the figure(s) on which the element(s) being described is (are) most clearly seen, although that (those) element(s) may be shown on other drawing figures also.

FIG. 1 illustrates a linear slide, constructed according to one embodiment of the present invention, generally indicated by the reference numeral 30. Linear slide 30 includes a base member 40, preferably formed of an extruded plastic or metal, in which is disposed for back-and-forth movement a moving carriage assembly 42. On top of moving carriage assembly 42 is a plurality of threaded holes 50 for the attachment of various apparatus (none shown).

FIG. 2 illustrates a linear stage, generally indicated by the reference numeral 60. Linear stage 60 includes a base member 70 in which is disposed for back-and-forth movement a moving carriage assembly 74. Moving carriage assembly 74 is shown driven by a lead screw 80 which, in turn, is driven by external means (not shown). On top of moving carriage assembly 74 is a plurality of threaded holes 90 for the attachment of various apparatus (not shown). Base member 70 includes end plates 92 and 94 which are describe more fully infra.

FIG. 3 illustrates a powered linear stage, generally indicated by the reference numeral 100. Powered linear stage 100 includes a base member 110 in which is disposed for back-and-forth movement a moving carriage assembly 112. Moving carriage assembly 112 is driven by a power source 120 mounted on one of end plates 122 and 124 and connected to means to drive the moving carriage. A plurality of threaded holes 130 is provided on top of moving carriage assembly 112 for attachment thereto of various apparatus (not shown).

Base members 40, 70, and 110 (FIGS. 1, 2, and 3, respectively) capture moving carriage assemblies 42, 74, and 112 (FIGS. 1, 2, and 3, respectively) through bearing surfaces on the moving carriage assemblies. The bearing surfaces on moving carriage assemblies 42, 74, and 112 have compensation capabilities for wear through adjustment mechanisms. Details thereof are discussed infra.

FIG. 4 illustrates base member 150 in which is disposed for back-and-forth movement a moving carriage assembly 152. Moving carriage assembly 152 includes an opening therethrough 160 for a lead screw, an adjuster screw 162, and two bearings 164 and 166 which engage complementarily shaped surfaces in the base member 150.

Figure 5:
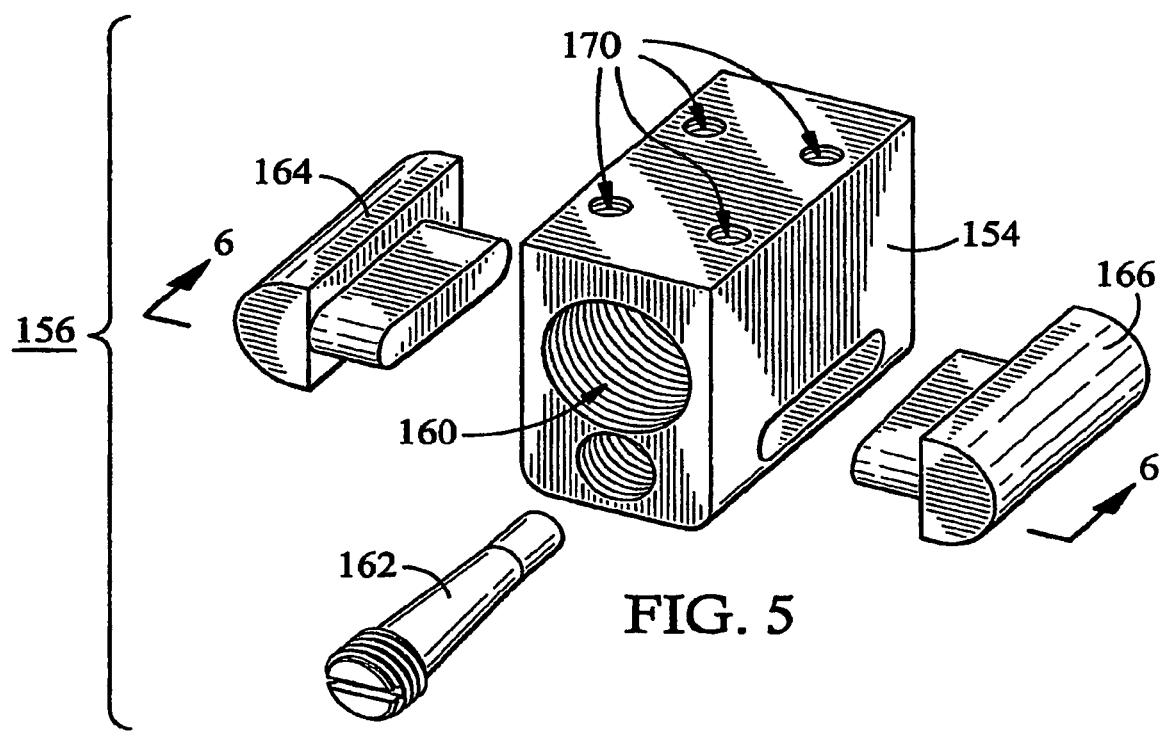
FIG. 5 is an exploded isometric view of a moving carriage according to the embodiment shown on FIG. 4.
Figure 6:
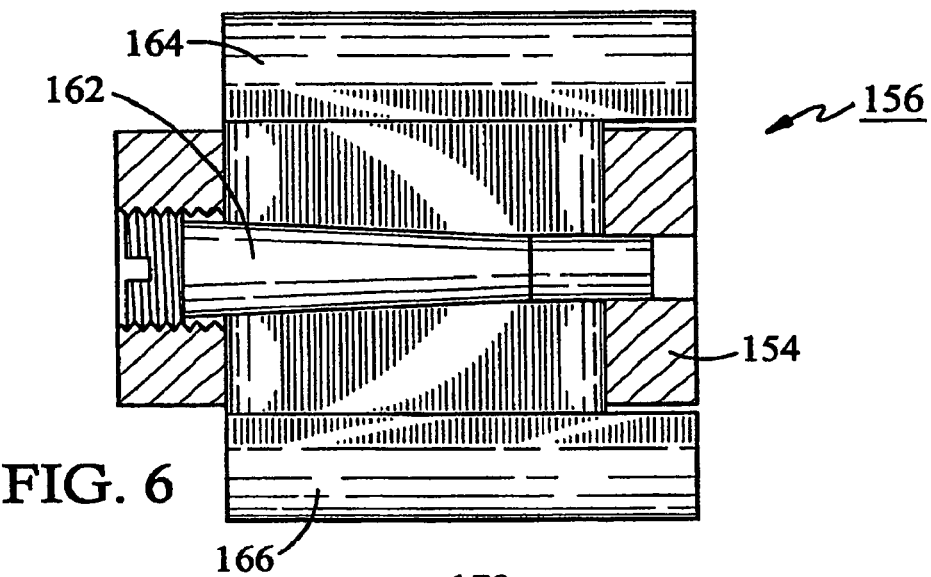
FIG. 6 is a top plan, cross-sectional view taken along line "6-6" of FIG. 5.

FIGS. 5 and 6 illustrate more clearly the details of the arrangement of the elements of a block 154 shown on FIG. 4. With reference to FIG. 5, on which there is illustrated a moving carriage assembly 156, there is shown a plurality of threaded holes 170 on top of block 154 for the attachment of various apparatus (not shown). With reference primarily to FIG. 6, adjuster screw 162 has threads thereon which screw into complementarily shaped threads on the central portion of block 154 and, as it threads into the central portion, it pushes on bearings 164 and 166 and spreads them away from each other.

Figure 7:
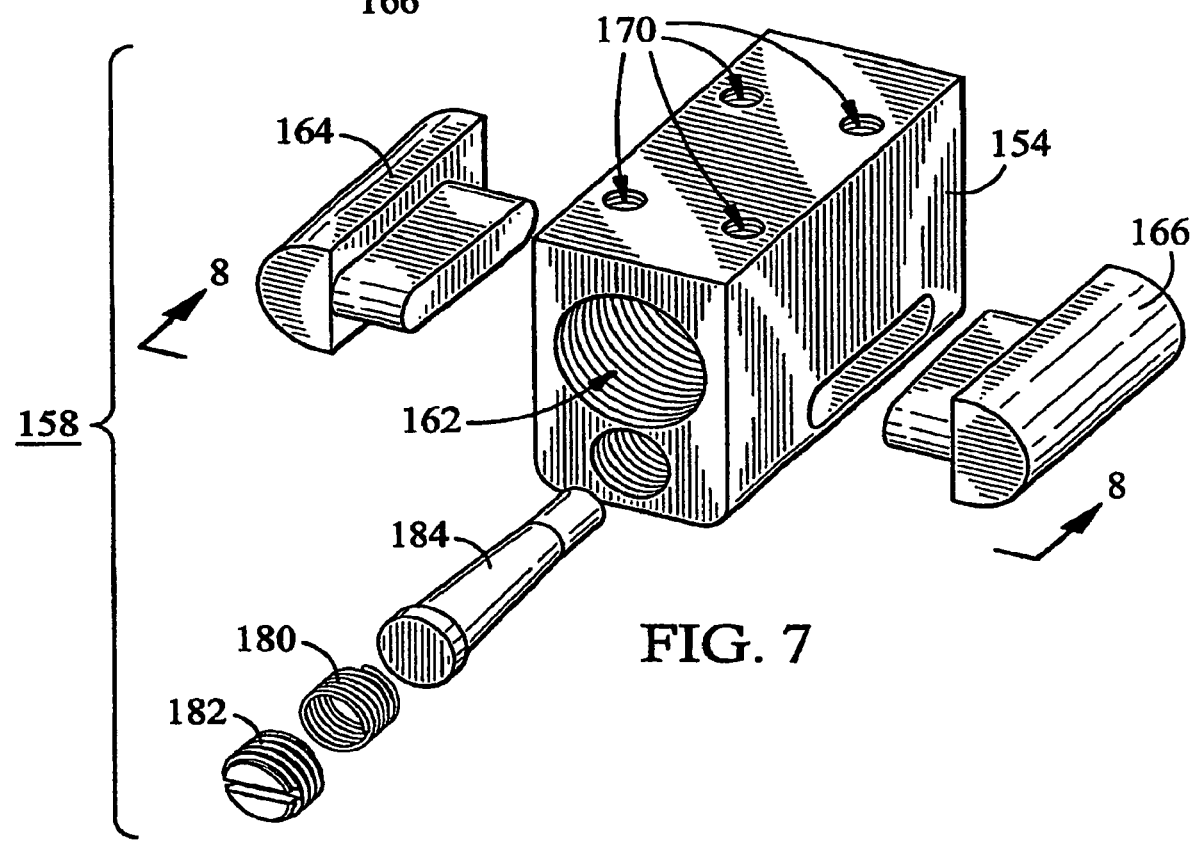
FIG. 7 is a fragmentary exploded isometric view of another embodiment of the present invention.
Figure 8:
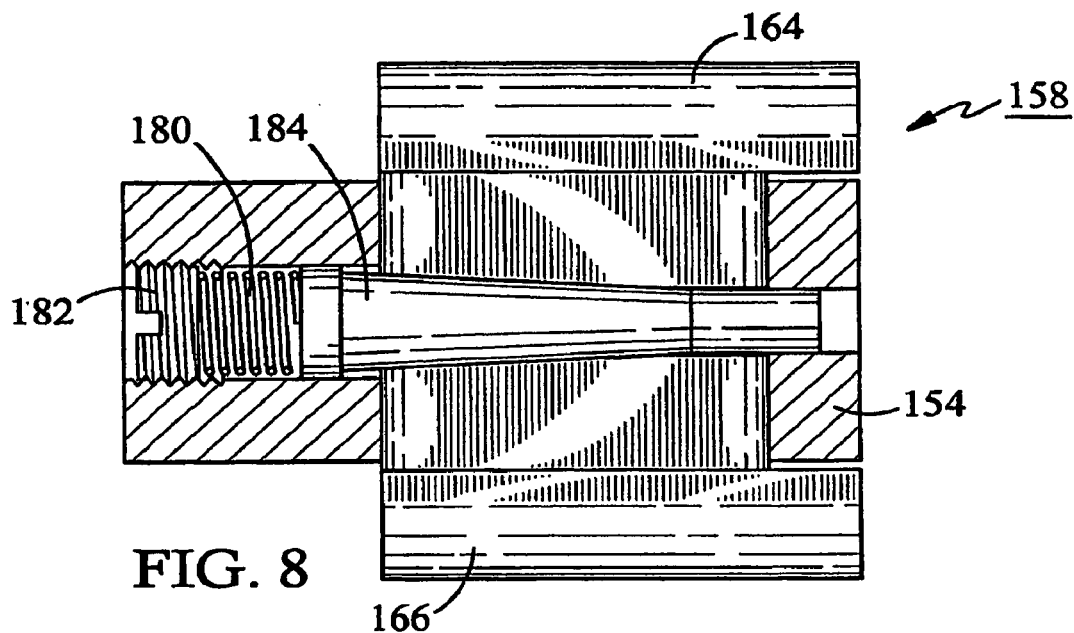
FIG. 8 is a top plan, cross-sectional view taken along line "8-8" of FIG. 7.

The elements of FIGS. 7 and 8, on which are illustrated a moving carriage assembly 158, are identical to the elements shown and described with reference to FIGS. 4-7, with the addition of a compression spring 180 disposed between a threaded nut 182 and a wedge 184, thus forming an automatic, self-compensating moving carriage assembly. Wedge 184 is placed in the hole and compression spring 180 is placed in the same hole as the wedge and is preloaded by threaded nut 182. As bearings 164 and 166 wear, compression spring 180 forces wedge 184 to move to the right on FIG. 8. Bearings 164 and 166 are forced away form each other removing any slop between the bearings and base 150 (FIG. 4).

Figure 9:
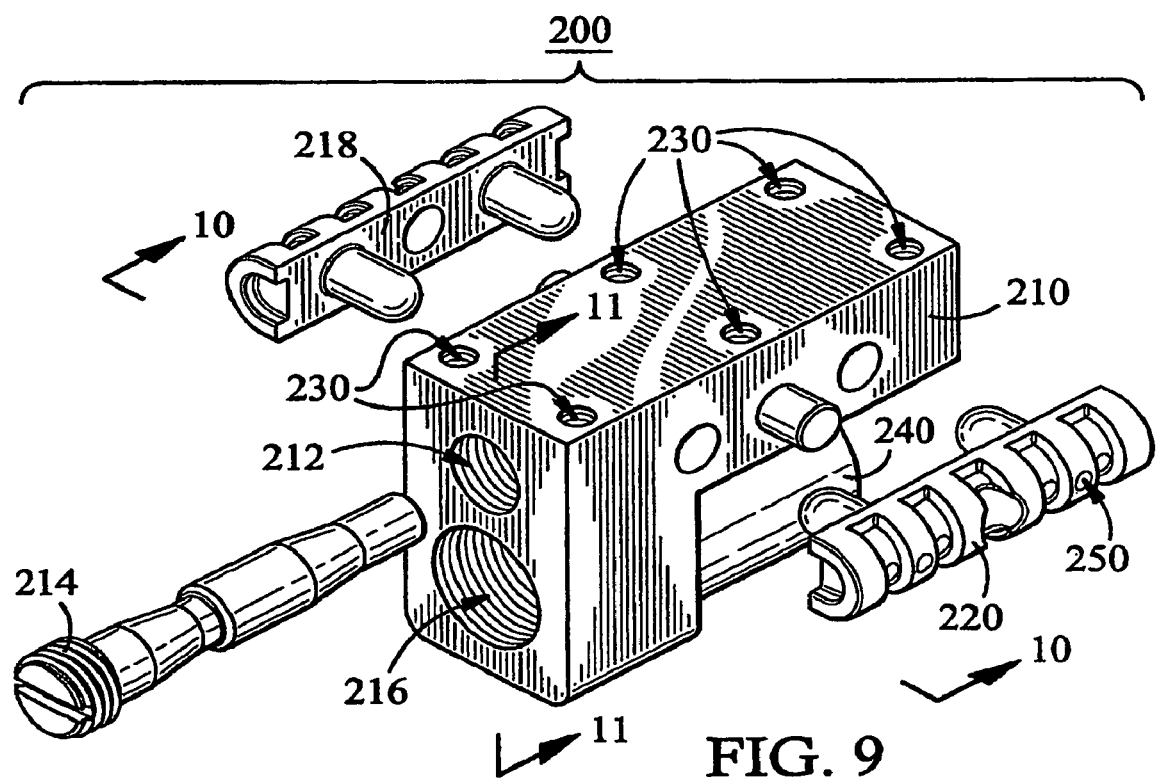
FIG. 9 is a fragmentary exploded isometric view of the embodiment of the moving carriage assembly shown on FIGS. 1-3.
Figure 10:
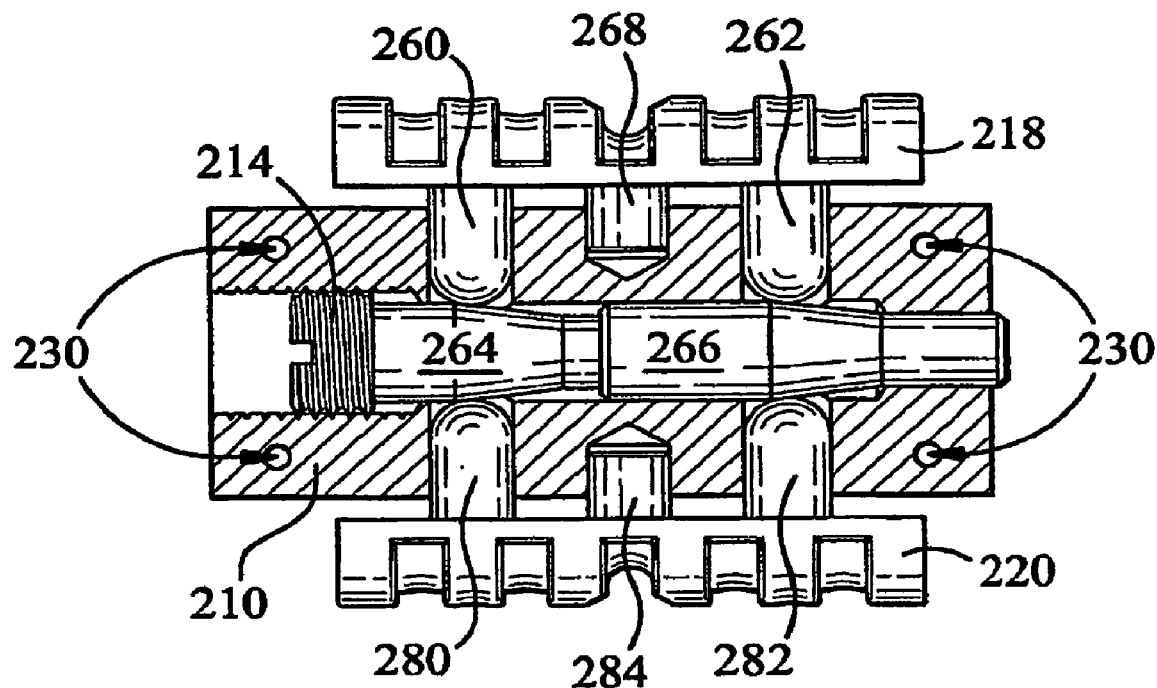
FIG. 10 is a fragmentary, top plan view, partially in cross-section, taken along Mine "10-10" of FIG. 9.
Figure 11:
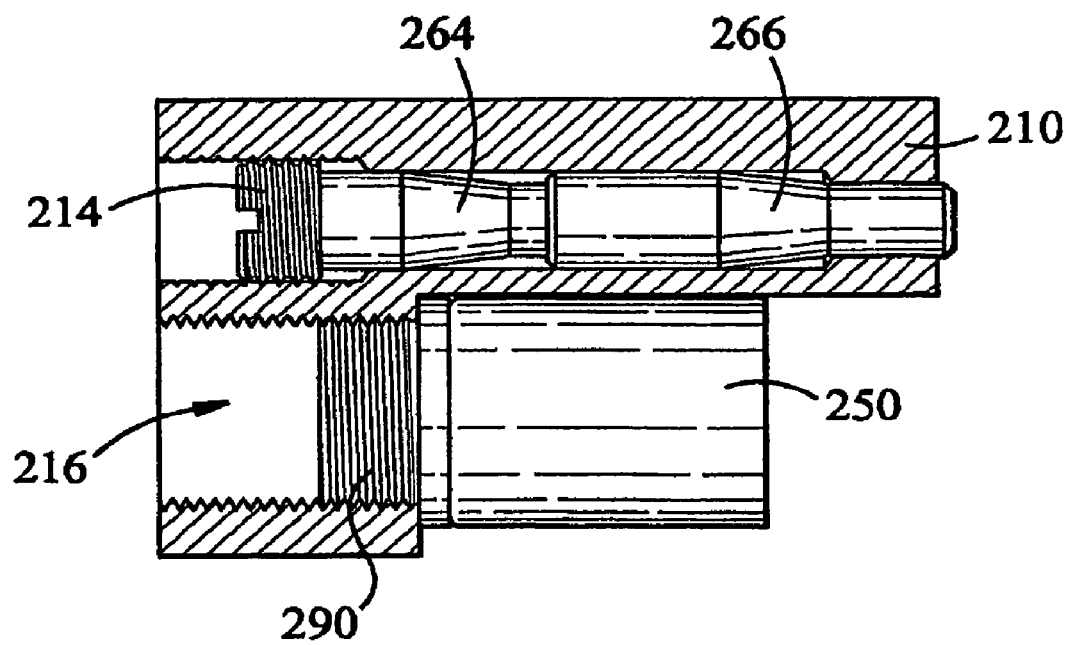
FIG. 11 is a side elevational view, partially in cross-section, taken along line "11-11" of FIG. 9.

FIGS. 9-11 illustrate that a moving carriage assembly, generally indicated by the reference numeral 200, can be further red to optimize the manufacture and performance of the linear slide shown on FIGS. 1-3. Moving carriage assembly 200 includes a central block 210 in which are defined threaded hole 212 for the insertion of an adjustment screw 214, a threaded hole 216 for a lead screw (not shown), and two bearings 218 and 220. On top of block 210 are threaded holes 230 for the attachment of various apparatus (not shown). Disposed at the base of block 210 is a high-precision nut assembly 240 for the lead screw. Holes, as at 250, are left over from the molding process, when bearings 218 and 220 are molded of a plastic material.

The elongated slot and tab interface (FIG. 5) has been replaced with holes and pins arrangement. FIG. 10 illustrates more clearly the operation of the holes and pins arrangement. Here, pins 260 and 262 are part of bearing 218 and ride, respectively, on tapered, round surfaces 264 and 266 of adjustment screw 214, while guide pin 268 is part of block 210. Likewise pins 280 and 282 are part of bearing 220 and ride, respectively, on tapered, round surfaces 264 and 266 of adjustment screw 214, while guide pin 284 is part of block 210.

It will be understood that as adjustment screw 214 is advanced into block 210, bearings 218 and 220 are forced outwardly by virtue of the tapered, round surfaces 264 and 266. This is illustrated also with reference to FIG. 11.

It is easier to manufacture and hold dimensional tolerance and achieve a good surface finish on the round holes. Standard tight-tolerance dowel pins or rods are readily available with good surface finish and can be inserted or pressed into the block resulting in improved alignment between the pins and holes. The symmetric design of the bearings eliminates any orientation issues and assures proper assembly of the bearings.

The bearing design as been adjusted to improve the sliding motion with respect to the mounting block. Although the adjuster screw has sufficient leverage to force the bearings outwardly, it is desirable that the bearings have little resistance to return inwardly when the adjuster screw is loosened. This requires that the sliding surfaces have good finish and dimensional tolerance without increasing the looseness of the carriage to base interface.

The construction shown on FIGS. 9-11 results in the pins being subject to the shear forces of the load on the carriage. They need to be sized and made from a material to properly accommodate this load while also providing good sliding performance. Additionally, the bearing needs to be thermally, chemically, and hygroscopically stable in order to be tolerant to many potential industrial, medical, instrumentation, and automation applications. Ideally, this would mean stainless steel pins and an internally lubricated thermoplastic bearing material for these embodiments, but the designs would not be limited to these choices.

Figure 12:
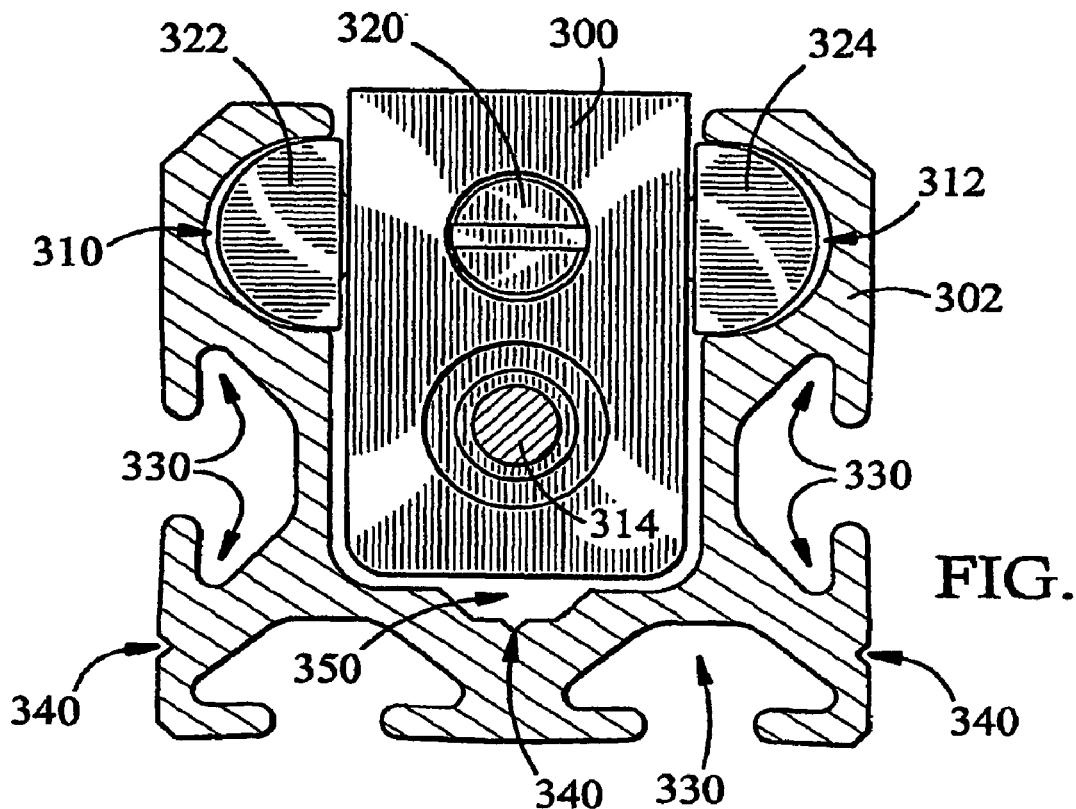
FIG. 12 is a font elevational view of the embodiment shown on FIG. 9 together with a base member.

As is illustrated on FIG. 12, a moving carriage assembly 300 and base 302 can be flier refined to optimize the performance and functionality of a linear slide. In this enhancement, bearing guide grooves 310 and 312 have been positioned at the top of linear slide base 302 above a drive mechanism 314. Of course, an adjustment screw 320 is positioned in between bearings 322 and 324. The embodiment shown on FIGS. 4-8 detailed a design in which bearing guide grooves were below a drive mechanism 160. While the general construction is consistent with the embodiment shown on FIGS. 4-8, the embodiment shown on FIG. 12 also allows for a multitude of mounting options. The T-slotted geometry 330 that can accommodate T-slot hardware and weld nuts. The base rail has increased in size to allow for T-slots on both sides and bottom of the base. There is no penalty for this size increase in that the geometry still remains within the profile of the motor size likely to drive the linear slide. An additional benefit of this arrangement is that the load to be driven can now extend over and past the motor increasing its versatility.

For a direct, over center load mounted to the moving carriage assembly, there would be very little difference in the dynamics of either of these embodiments as no moment force is created in the bearing guide grooves. However, in a cantilevered load condition, a moment force will be created in the bearing guide grooves based on the distance the load is from the bearing guide grooves. The design of the embodiment shown on FIG. 12 seeks to reduce that moment force by positioning the bearing guide grooves closer to the mounted load (not shown). By reducing this distance, the moment force is in turn reduced which has a positive effect on the dynamics of the system by reducing the loading on the drive mechanism. The performance of the entire system is thus improved by reducing the impediment to movement that a cantilevered load may cause.

The base design of this construction can be manufactured in a number of ways but lends itself most optimally to an extrusion of plastic or metal. Further mounting options can be accommodated with an extruded base geometry. Drill guide features 340 provide an index mark where alternative fastening points can be safely located and machined without affecting the motion of the moving carriage assembly. An index mark is easily accommodated with the extrusion process. A screw head guide 350 provides a means and location for straight down fastening of the extruded base with also not interfering in the motion of moving carriage assembly 300. The geometry in this case illustrates a flat head groove 350 flat would allow the head of the screw to be flush with or submerged below the U-channel within which moving carriage assembly 300 moves. The geometry could be designed for any standard head profile which then could be easily incorporated into the extrusion geometry.

Figure 13:
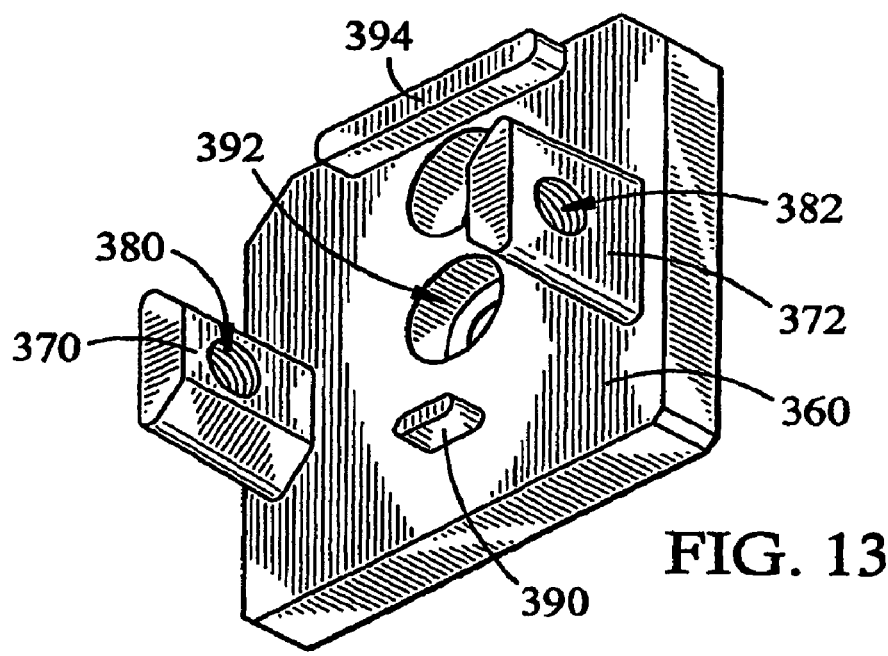
FIG. 13 is an isometric view of an end plate of the embodiment shown on FIGS. 1-3.

FIG. 13 illustrates a base end plate 360 that could be used to capture the linear slide components. Pursuant to extrusion as the ideal manufacturing method, it would also be desirable to avoid any secondary machining of the extrusion in order to complete the assembly of a linear slide. One salient characteristic of the end plate are the integral tab features 370 and 372 that project off the face of the part. The pair of tabs 370 and 372, trapezoidal in geometric shape, is sized to mate with the T-slot features on the side of the extruded base. Of course, other geometries can be provided as well. Each of the tabs is machined with a treaded hole 380 and 382, respectively. A third, smaller tab 390 is provided on end plate 360 below opening 392 for a drive mechanism, while a fourth tab 394 is provided at the top of the end plate.

Figure 14:
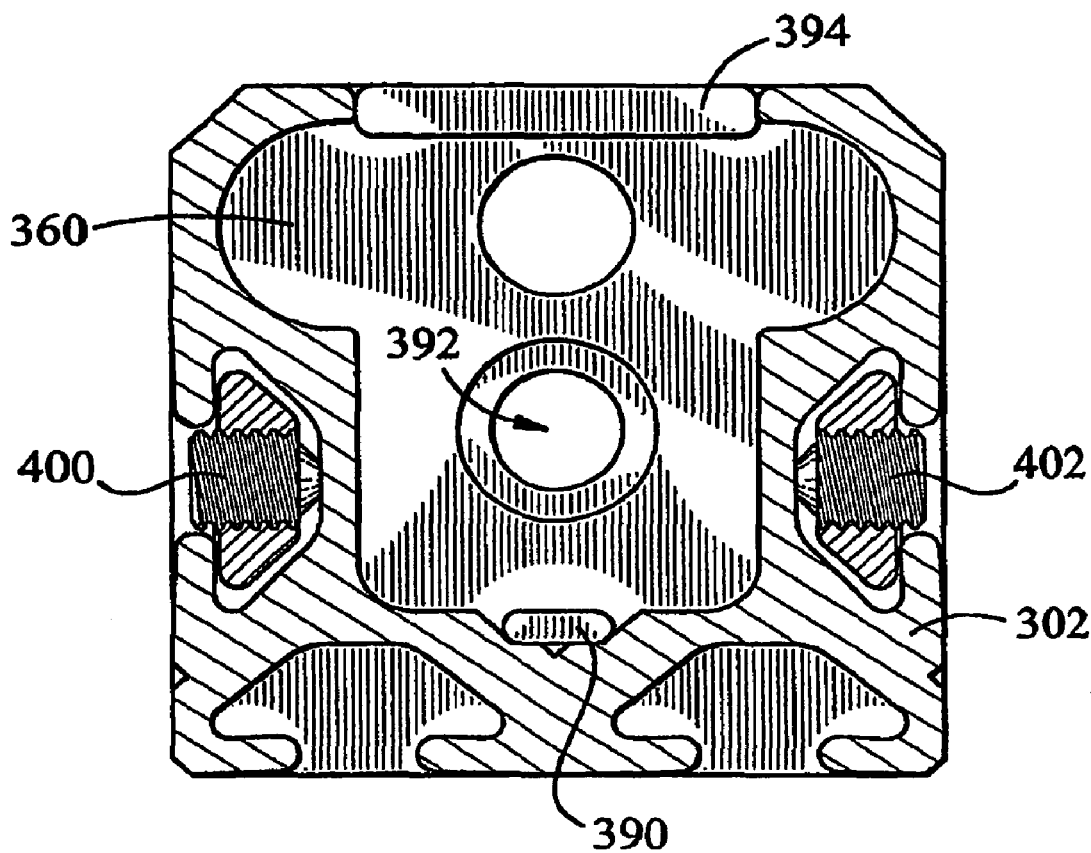
FIG. 14 is a fragmentary front elevational view, partially in cross-section, of the end plate of FIG. 13 mounted on a base member.

FIG. 14 illustrates that the end plate (FIG. 13) is mated to an end of base extrusion 302, a set screw 400 and 402, respectively, is inserted in the threaded hole 380 and 382 (FIG. 13) of each tab, and the set screws tightened to secure the end plate. Since the extrusion is of a softer material than the set screws, the set screws will indent the base material to some degree and create a detent preventing the inadvertent removal of the end plate. Third tab 390 is desirable to mate with the extrusion and provide a means for registering end plate 360 and base 302 together with fourth tab 394. In this arrangement, third tab 390 is sized to fit within the recess of screw bead groove 350 (FIG. 13) and fourth tab extends between open ends of base 302. By doing so, third tab 390 does not interfere with movement of moving carriage assembly 300 while positioning end plate 360.

Figure 15:
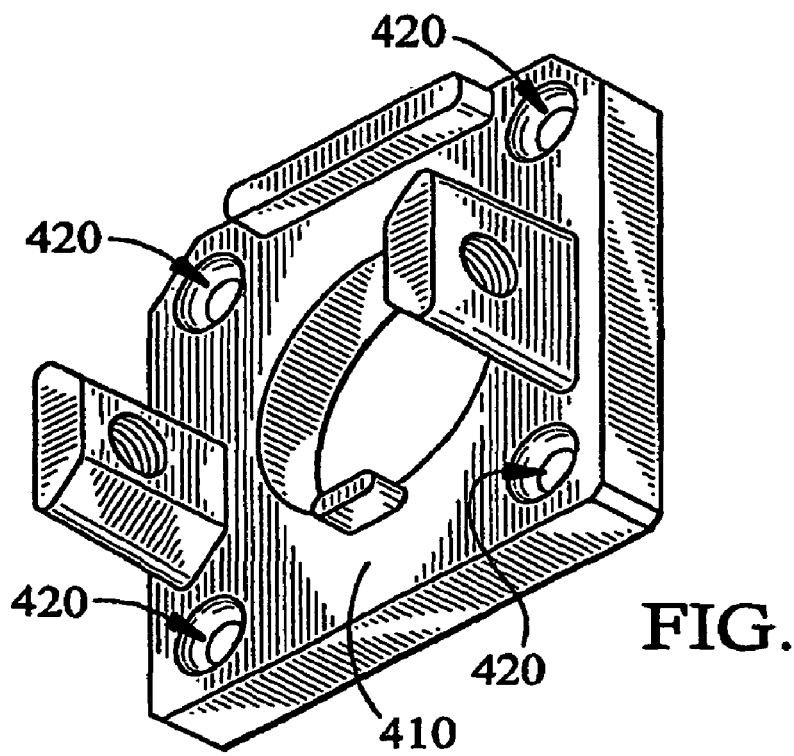
FIG. 15 is an isometric view of a motor end plate of the embodiment shown on FIGS. 1-3.

FIG. 15 illustrates a motor base end plate 410 that could be used in tandem with end plate 360 (FIG. 13) to capture components of a linear slide. End plate 410 utilizes the same mounting and positioning features previously described with reference to end plate 360 to register end plates 360 and 410 with respect to the extrusion and to each other, with the exception of openings 420 which are provided to mount the motor. This provides a cost effective solution while permitting the assembly to adapt to the wider dimensional tolerances expected from the extrusion process. The tab feature can easily be integrated into the motor end bell housing of the power source. This eliminates the need for a separate motor end plate part.

Linear slides require tight tolerances on the bearing surfaces. Without these tight tolerances, there will be large amounts of clearance between the moving carriage assembly and the base of the linear slide. The new design of the adjustable moving carriage assembly allows the bearing surfaces to be machined using standard tolerances, instead of the commonly used tight tolerances. Another benefit of the moving carriage assembly is the design can accommodate the greater dimensional variability expected from producing the base via an extrusion process. The moving carriage assembly can adjust the bearing surfaces to resolve any clearances produced between the moving carriage assembly and the base member. As a result, the adjustable moving carriage assembly yields an inexpensive product that can be produced with the positional accuracy of the more costly, precision machined linear slides.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "outer", "inwardly", "vertical", "horizontal", and the like, where used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illusive only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. An apparatus, comprising:
   (a) a longitudinally extending base member;
   (b) a moving carriage assembly member adapted to move axial back-and-forth in said longitudinally extending base member, wherein said moving carriage assembly member includes a block member;
   (c) two bearing members extending sideways, on opposite sides, from said moving carriage assembly and engaging longitudinal bearing guides disposed in said longitudinally extending base member; and
   (d) single means engaging said bearing members to simultaneously adjust said bearing members to take up any slop between said moving carriage assembly member and said longitudinally extending base member, where said single means includes a wedge shaped member engaging inner surfaces of said bearing members and advancing said wedge-shaped member into said block member, causing said bearing members to extend simultaneously outwardly into said longitudinal bearing guides; and
   wherein a compression biasing member is disposed between an adjusting nut and said wedge-shaped member to automatically extend outwardly said bearing members.

2. An apparatus, as defined in claim 1, further comprising: an end plate closing an end of said longitudinally extending base member, said end plate including at least two tabs extending therefrom, said at least two tabs extending into complementarily shaped openings defined in said base member and fastening means extending into openings defined in said at least two tabs and into said base member.

3. An apparatus, as defined in claim 2, further comprising: at least one locating tab formed on said end plate and extending into a complementarily formed opening defined in said longitudinally extending base member.

4. An apparatus, as defined in claim 1, wherein: said longitudinally extending base member is an extrude part of plastic or metal.

5. An apparatus, as defined in claim 4, wherein: said extrusion includes one or more members selected from the group consisting of a T-slot, a drill index, and a screw head groove, said members not interfering with movement of said moving carriage assembly.

6. A method, comprising:
   (a) providing a longitudinally extending base member;
   (b) providing a moving carriage assembly member adapted to move axial back-and-forth in said longitudinally extending base member, said moving carriage assembly member including a block member;
   (c) providing two bearing members extending sideways, on opposite sides, from said moving carriage assembly and engaging longitudinal bearing guides disposed in said longitudinally extending base member; and
   (d) providing single means engaging said bearing members to simultaneously adjust said bearing members to take up any slop between said moving carriage assembly member and said longitudinally extending base member, said single means including a wedge shaped member engaging inner surfaces of said bearing members and advancing said wedge-shaped member into said blocking member causes said bearing members to extend simultaneously outwardly into said longitudinal bearing guides; and
   (e) providing a compression biasing member disposed between an adjusting nut and said wedge-shaped member to automatically extend outwardly said bearing members.

7. A method, as defined in claim 6, farther comprising: providing an end plate closing an end of said longitudinally extending base member, said end plate including at least two tabs extending therefrom, said at least two tabs extending into complementarily shaped openings defined in said base member and fastening means extending into openings defined in said at least two tabs and into said base member.

8. A method, as defined in claim 7, further comprising: providing at least one locating tab formed on said end plate and extending into a complementarily formed opening defined in said longitudinally extending base member.

9. A method, as defined in claim 6, further comprising: providing said longitudinally extending base member as an extruded part of plastic or metal.

10. A method, as defined in claim 9, further comprising: providing said extrusion including one or more members selected from the group consisting of a T-slot, a drill index, and a screw head groove, said members not interfering with movement of said moving carriage assembly.

* * * * *